United States Patent [19]

Sorg et al.

[11] 4,012,218
[45] Mar. 15, 1977

[54] METHOD AND APPARATUS FOR MELTING GLASS

[76] Inventors: Helmut Sorg, Im Himbeergrund 33, 8752 Glattbach; Helmut Pieper, Buchenstrasse, 19, 877 Lohr, both of Germany

[22] Filed: Nov. 13, 1975

[21] Appl. No.: 631,563

[52] U.S. Cl. .................................. 65/135; 65/136; 65/337; 65/346; 65/347
[51] Int. Cl.² ............................................ C03B 5/02
[58] Field of Search ............ 65/135, 136, 337, 346, 65/347

[56] References Cited
UNITED STATES PATENTS

| | | | |
|---|---|---|---|
| 1,880,541 | 10/1932 | Wadman | 65/135 |
| 2,512,761 | 6/1950 | Arbeit | 65/136 |
| 2,902,524 | 9/1959 | Paxton | 65/347 X |
| 2,990,438 | 6/1961 | Lambert et al. | 65/135 |

*Primary Examiner*—Arthur D. Kellogg
*Attorney, Agent, or Firm*—Burgess, Dinklage & Sprung

[57] ABSTRACT

A glass melting furnace having a melting section and an adjacent refining section. The two sections are interconnected by a step or barrier which reduces the cross-sectional area of the furnace. The refining section has at least one plane of a plurality of electrodes immersed in the molten glass mass thru which energy is supplied to the molten glass mass. A refining zone is positioned below the region containing the electrodes from which refined glass is discharged thru an outlet therein.

17 Claims, 2 Drawing Figures

METHOD AND APPARATUS FOR MELTING GLASS

BACKGROUND

This invention relates to a glass melting furnace and to a method for melting glass therein. More particularly, it relates to a glass melting furnace having a melting section and an adjacent refining section which are interconnected via a cross-section reducing step or barrier.

In conventional horizontal glass melting furnaces, glass is melted and subsequently refined in adjacent refining and melting sections. Auxiliary heating electrodes can be provided in furnaces of this type. But furnace efficiency is unsatisfactory and the quality of the molten glass produced at high throughout rates is generally not satisfactory. In particular, large horizontal furnaces having large molten bath surface areas are low in efficiency compared to their volumes.

The horizontal flow that takes place in such glass melting furnaces can be controlled only with difficulty, and in practice some portions of the molten glass enter the passage connecting the melting and refining sections after an extremely short dwell period in the melting trough which seriously limits the performance of such troughs because with such a short dwell period, the molten glass still includes bubbles.

In vertically operated, electric glass melting furnaces, the electrodes are arranged in a plurality of vertically spaced planes (of U.S. Pat. No. 3,742,111 issued Jan. 26, 1973). Vertical furnaces, however, are of special construction, and it is not possible to convert conventionally heated horizontal furnaces into vertical electric furnaces.

Furthermore, vertical furnaces are operated solely with electric energy, are fully dependent on the supply of electrical energy, and the use of less expensive fuels such as gas or oil is not possible.

The present invention provides a method for melting glass and a glass melting furnace which do not suffer from the above discussed disadvantages. According to the present invention, it is now possible to melt glass with high quality by using a combination of conventional flame heating and electric energy. The furnace thus has high efficiency based on its volume. In particular, the method of the invention allows the conversion of existing, conventionally heated glass melting furnaces in such a manner that they operate with a high proportion of electric energy to produce improved quality glass with a substantial increase in performance or capacity. In addition, according to the invention, furnaces can be operated with conventional heating alone or with electric heating alone.

On a whole, the production of high quality glass is rendered more economical according to the invention because, depending on the cost of the different sources of heating energy, the energy proportions may be suitably selected, and additionally, the construction of furnaces according to the invention, by converting existing furnaces, is particularly economical, quick and easy.

SUMMARY

The glass melting furnace of the invention includes a melting section and an adjacent refining section. The two sections are interconnected by a step or barrier which reduces the cross-sectional area of the furnace. The refining section has at least one plane of a plurality of electrodes immersed in the molten glass mass thru which energy is supplied to the molten glass mass. A refining zone is positioned below the region containing the electrodes from which refined glass is discharged thru an outlet therein.

Glass is melted and refined according to the invention in a furnace of the invention which contains a molten glass mass or bath in adjacent melting and refining zones. The steps of the process include the following:

i. applying a layer of unmelted glass mixture to the surface of said molten glass mass;
ii. subjecting said glass mixture to heat energy from above to melt same;
iii. causing the molten glass to flow from the melting zone to the refining zone;
iv. causing the molten glass to decendend in the refining zone;
v. heating the descending molten glass in a horizontal zone in the refining zone by passing electrical current therethru; and
vi. homogenizing the molten glass in a further zone below the horizontal zone without supplying energy thereto and withdrawing refined glass from the further zone.

DESCRIPTION OF THE DRAWING

An embodiment of the present invention is described herein with reference to the accompanying drawing wherein.

DESCRIPTION

Figure 1:
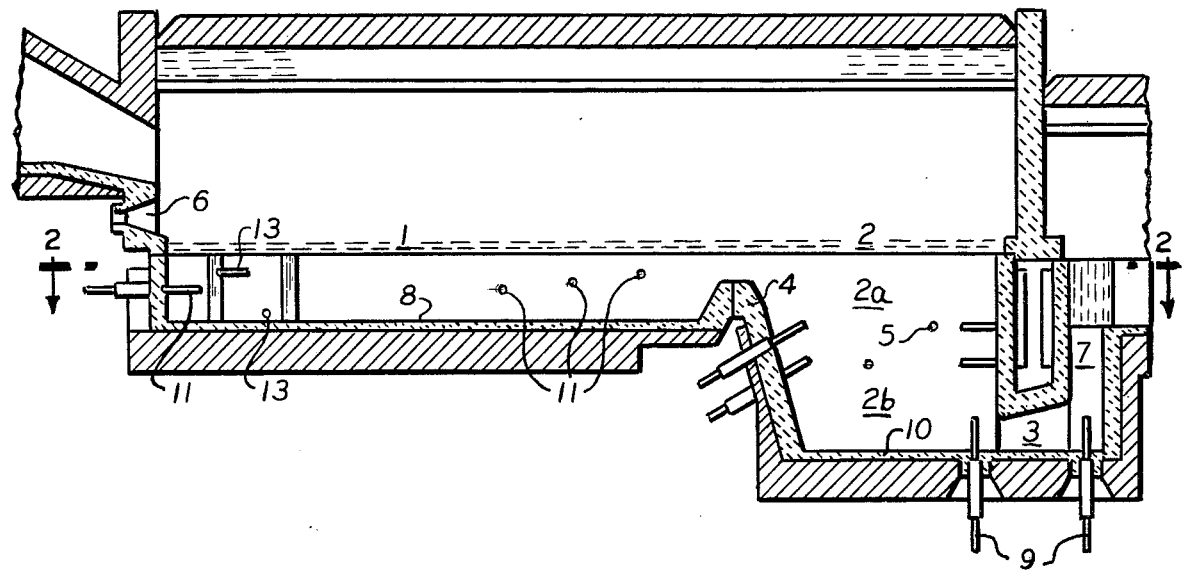
FIG. 1 is a vertical sectional view through a glass melting furnace according to the invention.

According to the present invention, the glass is initially conducted after and during the melting process, quantitative in a rising stream towards the surface of the bath in the refining section via a mechanical barrier. This initial flow from the melting zone can be aided by applying electrical energy from a plurality of sources in ascending sequence in the direction of flow.

At this point, the glass is additionally heated in a horizontal zone by passing electric current therethrough, such that the gas content of the glass is lowered to the required value or eliminated. Below this horizontal zone, the glass is homogenized and is thereafter withdrawn. The electrodes within the horizontal zone of the refining section are arranged and connected in such a way that a strong, downwardly directed flow of the molten glass is prevented, and the glass, rather, descends substantially uniformly across the cross-sectional area of the refining portion. Thus, an energy concentration is provided in that portion of the refining section in which, without electric heating, the main discharge flow would take place in a conventional furnace.

The glass melting furnace is characterized by a refining section having at least one plane of a plurality of electrodes immersed in the molten glass and through which energy is supplied to the molten glass or bath such that gas bubbles are released, and further a zone below said plane in which homogenization of temperature is effected and from which the glass is discharged or withdrawn through an outlet.

In order to obtain high quality glass, the depth of the refining section is preferably about twice the depth of the melting section which also results in an economical construction of the furnace.

In the above-described embodiment, the electrodes may be positioned in the refining section approximately at the level of the bottom of the melting section, and the surface of the melting section may be up to three times and preferably twice that of the refining section. In order to obtain a high specific capacity or efficiency, the melted glass mixture preferably covers the surface of the molten glass in the melting and of refining sections.

The glass melting furnace according to the present invention is constructed, in a conventional manner, with refractory material which is provided with a thermally insulated steel frame. Above the glass bath or molten glass mass, a vault or roof with burners in burner openings 6 is provided. The vault, the brickwork and the steel frame are constructed in the conventional fashion within the discretion of the skilled artisan.

The glass melting furnace according to the invention includes a shallow melting section 1 and an adjacent substantially deeper refining section 2. The two adjacent sections are interconnected through an overflow barrier or step 4 in such a way that molten glass may flow from section 1 into section 2. The barrier 4 is dimensioned such that the depth of the molten glass in section 2 is about twice the depth in section 1, i.e., the bottom 10 of the refining section 2 is deeper than the bottom 8 of the melting section 1 by a factor of about two.

From the refining section 2, an outlet 3 extends to a feeder 7 and auxiliary heating electrodes 9 supply energy to the stream of the outflowing glass in a known manner, such that the temperature within the glass stream is maintained constant or prevented from decreasing substantially.

Figure 2:
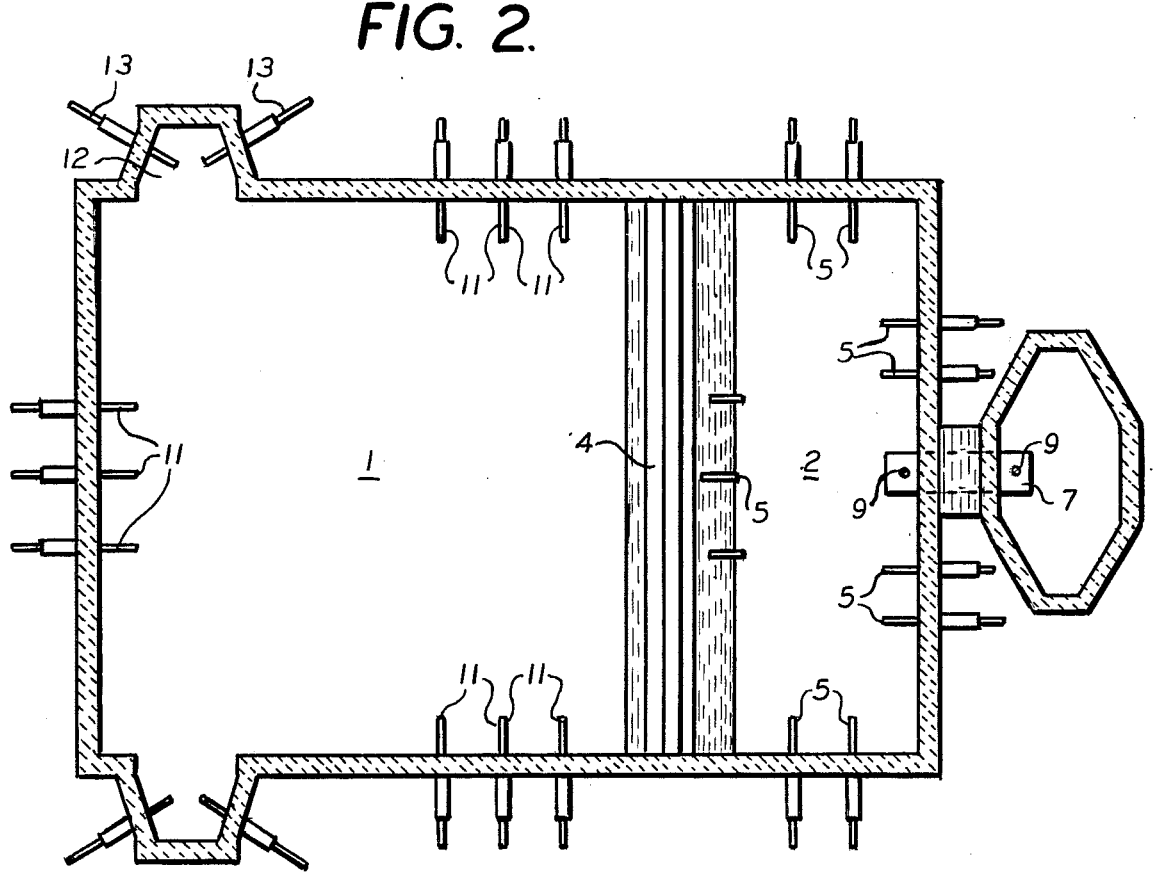
FIG. 2 is a horizontal sectional view taken along line II—II of FIG. 1.

The refining section 2 includes an upper zone 2a and a lower zone 2b. A plurality of electrodes 5 are positioned between the zones 2a and 2b. The electrodes 5 can be positioned both at the long sides and at the short sides of the rectangular refining section 2, and as shown in FIGS. 1 and 2 the electrodes 5 can be arranged in a single plane or they may be disposed in a plurality of planes according to a further embodiment of the invention and as shown in the drawing. The level of the electrodes 5 is chosen such that they are slightly above the level of the bottom 8 of the melting section 1, or that they are positioned at the level of the bottom 8, respectively. The entire surface of the molten glass bath in sections 1 and 2 can be covered by unmelted batch and it is also possible to supply unmelted batch only to the surface of the melting section 1.

Normally, the melting section 1 has a greater surface area than the refining section 2. Thus about two-thirds of the overall surface area of the glass bath can be in the melting section 1 and about one-third the refining section 2. Depending on the type of the glass to be melted and on the specific capacity or efficiency of the furnace, these ratios may be varied as well; for example, the ratio of the surface areas between the melting and refining sections may vary between 3 to 1 to 1 to 1.

The method of the invention is carried out as follows: An unmelted glass mixture (commonly referred to as "batch") is supplied to the entire surface of the molten glass mass and is heated from above by combustion gases from the burners 6 such that the mixture or batch is heated and melted at the interface between the mixture and the molten glass mass. The molten but not yet refined glass from the melting section 1 flows over the barrier or step 4, preferably in a substantially horizontal stream, into the refining section 2 where it is mixed with the glass melted in zone 2a in the refining zone 2. Then the raw molten glass descends uniformly down through the horizontal zone containing the electrodes 5. The molten glass is heated further and is refined and homogenized in the deeper zone 2b. In zone 2b, the temperature of the glass is slightly reduced again, and the flow is free from turbulence. The descent of unmelted glass particles from the batch is positively prevented by the action of the electrodes 5.

The refined glass then flows through the outlet 3 to upwardly extending glass passage 7 which can serve as a feeder.

Alternatively, the unmelted glass mixture may be prevented from covering the molten glass in the region of the refining section 2. Although the specific capacity of the furnace is reduced in this case, it becomes possible to melt glass of a particularly high quality and to produce certain types of glass that are difficult to melt. In general, however, this measure will not be necessary since the combination of melting zone 1, electrodes 5 disposed in one or more planes in refining zone 2 and zones 2a and 2b ensure sufficient refining.

The glass melting furnace of the invention may be constructed (e.g. during conversions of a conventional furnace) in such a manner that the refining section 2 is made substantially deeper with electrodes 5 installed therein. In this way, it becomes possible to melt the glass by electrical means even in the case where reconstruction of a fully electric glass melting furnace is not possible.

As shown in FIGS. 1 and 2, the melting section or zone 1 can be provided with electrodes 11 in the side and end walls of the furnace to supplement or replace heating by the burner 6. Perferably as shown in FIG. 1 the electrodes 11 in the side walls are spaced from each other each with an increasing distance from the bottom 8 of the melting section 1 (in ascending sequence) in the direction of glass flow (e.g. toward the barrier 4). Similarly, electrodes 13 can be provided in the glass mixture feed openings 12, one close to the bottom 8 and the other close to the interface between the molten glass and the batch (FIG. 1).

In the refining zone 2, the electrode in one plane are preferably staggered with respect to the electrodes in the other plane (FIG. 1).

What is claimed is:

1. Glass melting furnace comprising a melting section, a refining section adjacent to the melting section, an enclosed heating section above and common to the melting and refining sections, the depth of the refining section being at least twice the depth of the melting section, means to supply unmelted glass batch to the surface of the molten glass bath in the melting and refining sections, means to heat the heating section such that the batch is heated and melted at the interface between the molten glass bath and the batch, and outlet means at the bottom of the refining section for discharging refined molten glass.

2. Glass melting furnace of claim 1 wherein said refining section has at least one plane of a plurality of electrode means immersed in the molten glass through which energy is supplied to the molten glass mass.

3. Glass melting furnace of claim 1 wherein the melting section and the refining section are interconnected by a step or barrier which reduces the cross-sectional area of the furnace.

4. Glass melting furnace of claim 2 wherein said electrodes are arranged approximately at the level of the bottom of said melting section.

5. Glass melting furance of claim 1 wherein the surface area of said melting section is up to three times greater than that of said refining section.

6. Glass melting furnace of claim 1 wherein the surface area of said melting section is about twice as great as said refining section.

7. Glass melting furnace of claim 1 wherein auxiliary electrodes are provided in said outlet means.

8. Glass melting furnace of claim 1 wherein the batch is heated by combustion gases from barrier means positioned in the heating section.

9. Glass melting furnace of claim 2 wherein said melting section has a plurality of electrodes around its periphery.

10. Glass melting furnace of claim 1 wherein said melting section has at least one opening for feeding batch mixture, each of said openings having one or more electrodes positioned thereunder.

11. Method for melting and refining glass in a furnace containing a molten glass mass in a melting zone and an adjacent refining zone having a depth at least twice the depth of the melting zone, said furnace having a common heating zone above the melting and refining zones, which comprises:

i. applying a layer of unmelted batch mixture to the surface of said molten glass mass in the melting and refining zones;

ii. subjecting the batch mixture to heat energy from the heating zone over the entire surface of the unmelted batch to melt same at the interface between the molten glass mass and the batch;

iii. withdrawing refined molten glass from the bottom of the refining zone thereby causing molten glass to flow from the melting zone to the refining zone and to descend in the refining zone where the molten glass is homogenized without supplying energy thereto.

12. Method of claim 11 wherein the molten glass flows from the melting zone in a substantially horizontal stream into the refining zone above the region where the molten glass is homogenized.

13. Method of claim 11 wherein the molten glass descends substantially uniformly in the refining zone.

14. Method of claim 11 wherein additional heat is supplied to the molten glass in the melting zone by passing electrical current therethrough.

15. Method of claim 11 wherein additional heat is supplied to the molten glass in a horizontal zone in the refining zone by passing electrical current therethrough.

16. Method of claim 11 wherein the molten glass flows initially from the melting zone in a rising stream towards the surface of the molten glass in the refining zone.

17. Method of claim 14 wherein electrical energy is applied to the molten glass from a plurality of sources in ascending sequence in the direction of flow.

* * * * *